(12) United States Patent
Motohashi

(10) Patent No.: US 6,304,331 B1
(45) Date of Patent: Oct. 16, 2001

(54) EXPOSURE CONTROL DEVICE AND DISTANCE MEASURING DEVICE

(75) Inventor: Kazutaka Motohashi, Chiba-ken (JP)

(73) Assignee: Seiko Precision Inc., Tokyo (JP)

( * ) Notice: Subject to any disclaimer, the term of this patent is extended or adjusted under 35 U.S.C. 154(b) by 0 days.

(21) Appl. No.: 09/516,717

(22) Filed: Mar. 1, 2000

(30) Foreign Application Priority Data

Mar. 31, 1999 (JP) .................................................. 11-092937
Apr. 13, 1999 (JP) .................................................. 11-105272

(51) Int. Cl.$^7$ .............................. G01B 11/14; G03B 7/08
(52) U.S. Cl. .............................................. 356/614; 396/61
(58) Field of Search ............................ 356/375, 23, 213, 356/218, 221, 233; 396/61, 121, 166, 89

(56) References Cited

U.S. PATENT DOCUMENTS

| | | |
|---|---|---|
| 4,941,009 | 7/1990 | Yoshida . |
| 5,023,647 | 6/1991 | Shiomi et al. . |
| 5,687,400 * | 11/1997 | Ishiguro et al. ..................... 396/61 |
| 5,752,063 | 5/1998 | Ishiguro et al. . |
| 5,832,315 * | 11/1998 | Ishiguro ................................. 396/61 |
| 6,029,015 * | 2/2000 | Ishiguro .............................. 396/187 |
| 6,085,040 * | 7/2000 | Yasukawa .............................. 396/61 |

\* cited by examiner

*Primary Examiner*—Hoa Q. Pham
(74) *Attorney, Agent, or Firm*—Jordan and Hamburg LLP

(57) ABSTRACT

A disadvantage can be solved, in which an amount of light passing through a shutter aperture varies depending upon different reflection coefficients of objects. When a switch is set ON, a control circuit detects a reflection coefficient of a subject object on the basis of an output from a PSD. Concretely, the reflection coefficient of the subject object is detected on the basis of a correlation between a distance up to the subject object, which is found by making use of outputs from terminals of the PSD, and magnitudes of outputs from the terminals. Subsequently, an FM control value is found by calculation on the basis of the distance up to the subject object and the reflection coefficient of the subject object. A diaphragm assumes the FM control value as the shutter aperture increases. A stroboscope device is controlled by a stroboscope drive circuit to project light, and light reflected by the subject object is made to be incident on a photosensitive section through the shutter aperture for photographing.

9 Claims, 5 Drawing Sheets

EXPOSURE CONTROL DEVICE AND DISTANCE MEASURING DEVICE

BACKGROUND OF THE INVENTION

The present invention relates to an exposure control device and a distance measuring device.

Conventionally, exposure control devices are provided with a stroboscope or the like, for use in cameras or the like include one, in which a stroboscope is made constant in amount of luminescence, for example, at a time to change a diaphragm at the time of stroboscope radiation, depending upon a distance up to an object. Concretely, a diaphragm F serving as a standard at the time of stroboscope radiation is found from the following formula (1) on the basis of a distance L up to an object and a guide number GNo of a stroboscope, and the diaphragm F thus found is corrected on the basis of film sensitivity to provide a diaphragm F' at the time of stroboscope radiation, so-called, there is FM operation to provide a diaphragm F' at the time of stroboscope radiation.

$$F = GNo/L \tag{1}$$

Also, some exposure control devices change an amount of luminescence of a stroboscope on the basis of a distance to the object to be photographed, and some ones automatically detect a distance up to an object.

With the above described exposure control devices, however, a reflection coefficient of an object is not taken account of, that is, it is assumed that a reflection coefficient of an object to be photographed is constant. Accordingly, in the case where a reflection coefficient of an object is high even when a distance up to an object is the same, an amount of luminescence passing through a shutter aperture increases in amount, and in the case where a reflection coefficient of an object is low, an amount of luminescence passing through a shutter aperture decreases in amount. That is, there has been a problem that an amount of luminescence passing through a shutter aperture varies due to a difference in reflection coefficients of objects to be photographed.

Also, the above described problem gives rise to a problem that, in the case where light passing through a shutter aperture subjects a sensitive member to exposure, a degree of exposure varies depending, upon a difference in reflection coefficients of objects to be photographed.

Further, there is a problem that a construction becomes large because of the need of separate constructions for detection of a distance up to an object and for detection of a reflection coefficient of the object when both of the distance and the reflection coefficient are to be detected.

SUMMARY OF THE INVENTION

The invention comprises distance measuring means for detecting a distance up to an object, reflection coefficient detecting means for detecting a reflection coefficient of the object, a flash device for radiating light on the object, and a control circuit for controlling an amount of exposure in use of the flash device in accordance with the distance up to the object and the reflection coefficient of the object, and so can control an amount of exposure in use of the flash device in accordance with the distance up to the object and the reflection coefficient of the object. Accordingly, it is possible to mitigate a problem that an amount of exposure varies depending upon different reflection coefficients of objects, which are disposed at the same distance.

The distance measuring means includes light receiving means adapted to receive light from the object and makes use of an output from the light receiving means to detect the distance up to the object, and the reflection coefficient detecting means detects the reflection coefficient of the object on the basis of an output from the light receiving means, whereby the light receiving means of the distance measuring means can be used to detect the reflection coefficient of the object. Accordingly, it is possible to reduce the number of parts in addition to an effect similar to that described above. In other words, it is possible in an exposure controlling device, which performs measuring a distance to the object, to solve a problem related to an increase in the number of parts, caused by virtue of newly providing a light receiving means for detection of reflection coefficient, which serves to detect a reflection coefficient of an object being detected.

The invention comprises distance measuring means having light receiving means adapted to receive light incident from an object being detected, and making use of an output from the light receiving means to detect a distance up to the object, and reflection coefficient detecting means for detecting a reflection coefficient of the object being detected, on the basis of an output from the light receiving means, and so can detect a reflection coefficient of the object being detected, using the light receiving means for measuring a distance to the object. Accordingly, it is possible to reduce the number of parts. In other words, it is possible to solve a problem related to an increase in the number of parts, caused by virtue of newly providing a light receiving means for detection of reflection coefficient, which serves to detect a reflection coefficient of an object being detected.

DESCRIPTION OF THE PREFERRED EMBODIMENTS

Figure 1:
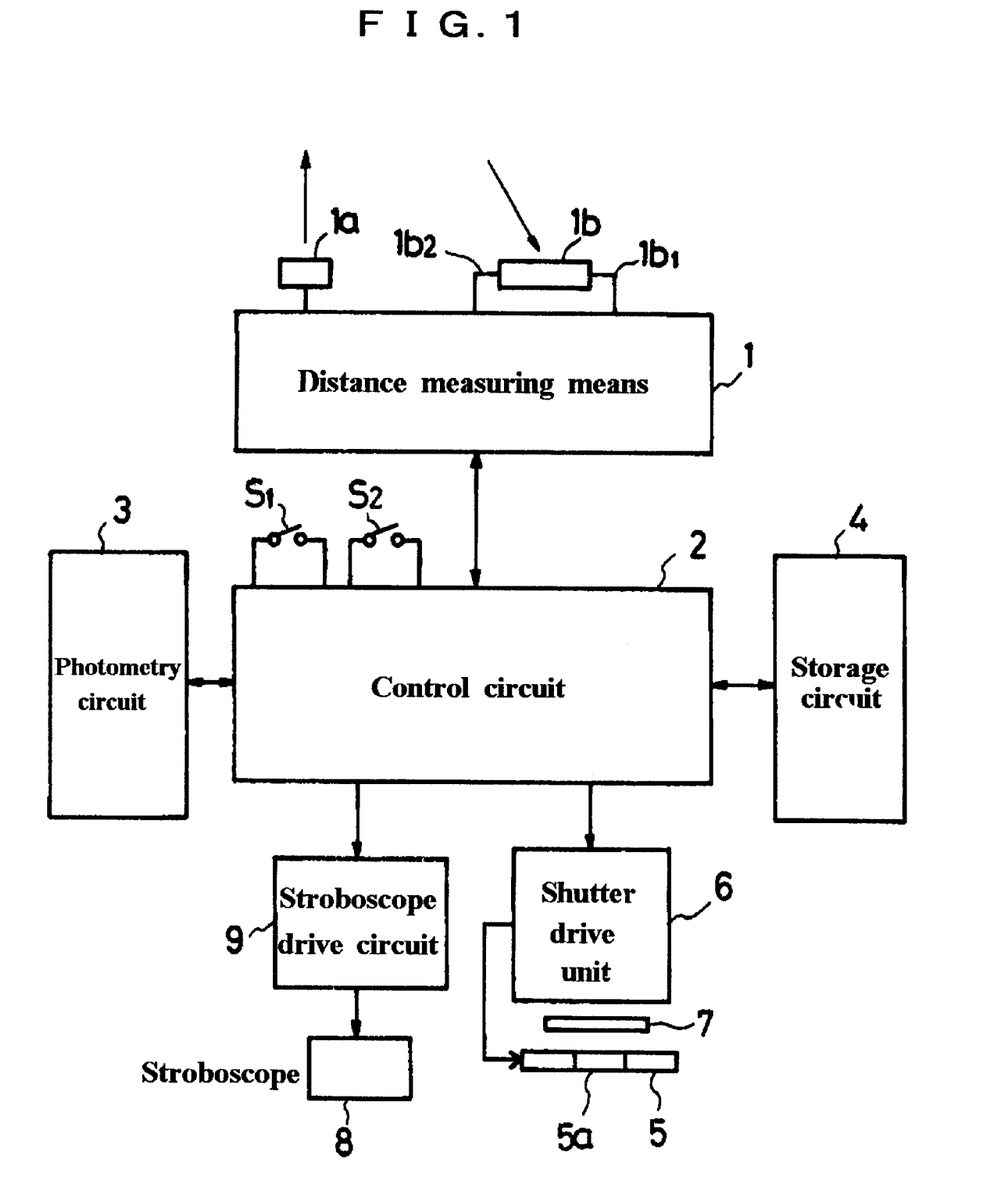
FIG. 1 is a view showing a block circuit, which is exemplary of an embodiment of the invention.

An embodiment of the invention will be concretely described with reference to the drawings. In FIG. 1, distance measuring means 1 comprises a ZED 1a for projecting light to an object (not shown), and a PSD 1b which receives the projected light reflected by the object, the distance measuring means being a so-called active type one which detects a distance to the object using output from the PSD 1b. The PSD 1b constitutes alight receiving means. When light is received by the PSD 1b, the PSD 1b outputs two signals which vary depending upon intensity of light and a location of its light-receiving portion. Light received by the PSD 1b moves toward a side of a terminal 1b2 from a side of a terminal 1b1 on a PSD 1b as the object is disposed nearer the distance measuring means. Therefore, two signals output from the terminals 1b1 and 1b2 vary in correlation depending upon a distance up to the object. In the embodiment, the distance measuring means 1 finds a distance up to the object on the basis of a so-called triangulation by making use of a change in a position where light is received on the PSD 1b.

A control circuit 2 comprises a CPU, a ROM, a RAM and so on. The control circuit 2 controls various actions in accordance with an action program, which is written in the ROM, and functions as a reflection coefficient detecting means to detect a reflection coefficient of the object on the basis of an output from the PSD 1b. In addition, while the control circuit 2 and the distance measuring means 1 are separately shown in the figure for simplicity of explanation, the distance measuring means 1, which detects a distance up to the object on the basis of an output from the PSD 1b, actually functions as a part of software processing in the control circuit 2. More specifically, the control circuit 2 detects a distance up to the object on the basis of an output from the PSD 1b. A photometry circuit 3 detects a surrounding brightness. A storage circuit 4 comprises a EEPROM, and stores data for detection of reflection coefficient, and the like. A shutter means 5 includes a sector (not shown), which forms a shutter aperture 5a, such that a shutter driving unit 6 drives the sector to open and close the shutter aperture 5a so as to permit light passing through the shutter aperture 5a to expose a sensitive member 7 (film or the like). A stroboscope device 8, serving as a flash device, is driven by a stroboscope drive circuit 9 to project light for illumination of an object. In the embodiment, when an amount of light for a stroboscope device 8 is determined, a so-called FM control is performed, which changes a diaphragm, at the time of stroboscope radiation, depending upon a distance up to an object. A switch S1 is made ON by depressing of a release switch (not shown) up to a first stage and a switch S2 is made ON by depressing of a release switch (not shown) up to a second stage following the first stage. In addition, the control circuit 2, the shutter means 5 and the shutter driving unit 6 constitute a control means.

Figure 2:
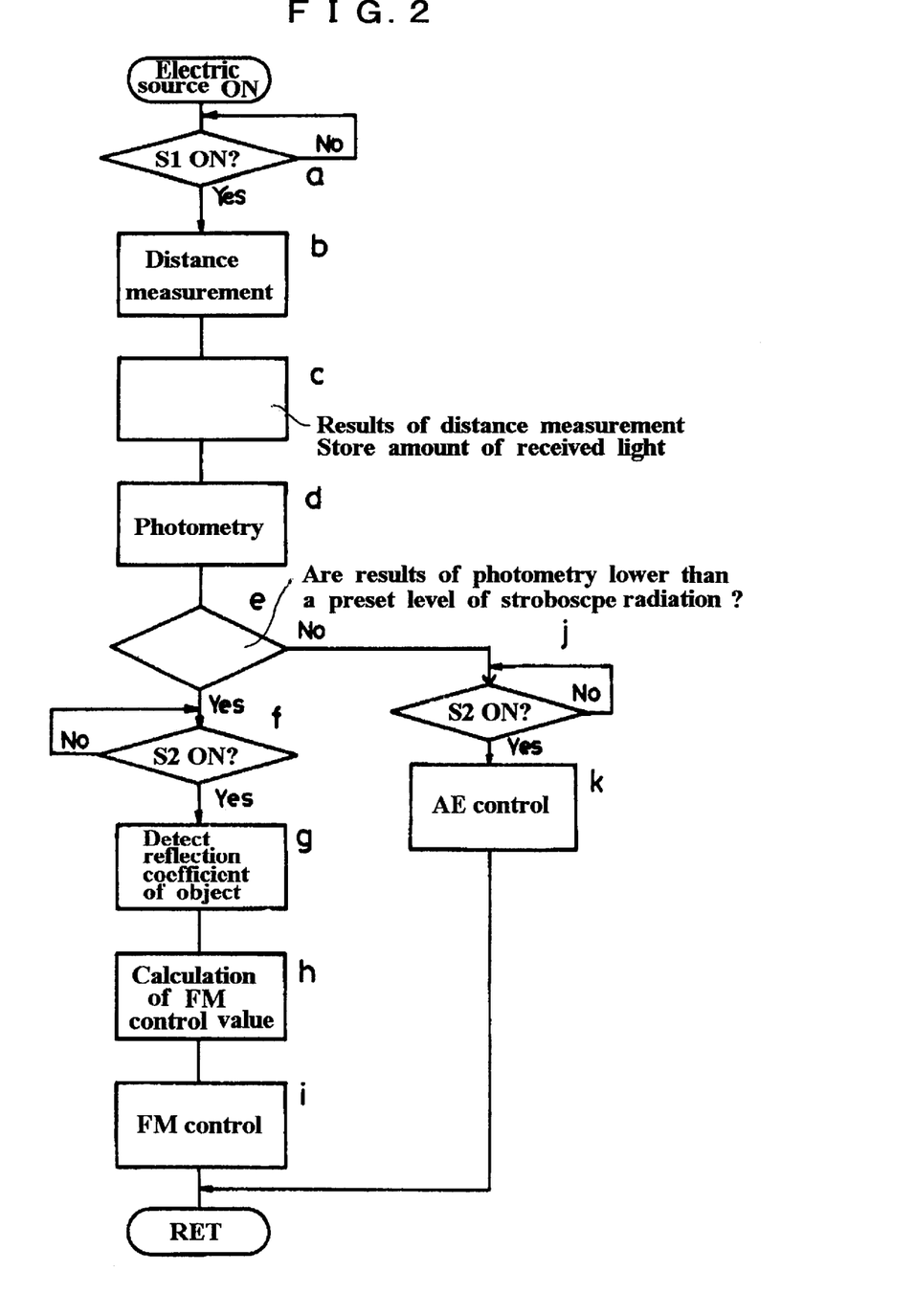
FIG. 2 is a flowchart for the purpose of explanation.

Referring to FIGS. 1 and 2, when the release switch is depressed up to the first stage to set the switch S1 ON (STEP 1), the control circuit 2 starts a distance measuring action (STEP 2). The control circuit makes the LED 1a emit light to project light on an object (not shown), and detects a distance up to the object by making use of outputs from the terminals 1b1 and 1b2 of the PSD 1b.

The control circuit 2 stores in the RAM a sum of outputs from the terminals 1b1 and 1b2 of the PSD 1b (STEP c), and makes the photometry circuit 4 act to detect a distance surrounding brightness (STEP d).

When results of photometry detected are lower than a preset level of stroboscope radiation (STEP e), the control circuit 2 judges the necessity of stroboscope and waits until the release switch is depressed up to the second stage to make the switch S2 ON (STEP f).

When the release switch is depressed up to the second stage to set the switch S2 ON, the control circuit 2 detects a reflection coefficient of the object on the basis of an output from the PSD 1b (STEP g). The control circuit detects a reflection coefficient of the object on the basis of a correlation between a distance up to the object, which is found by making use of outputs from the terminals 1b1 and 1b2 of the PSD 1b, and a magnitude of a sum of outputs from the terminals 1b1 and 1b2.

Figure 3:
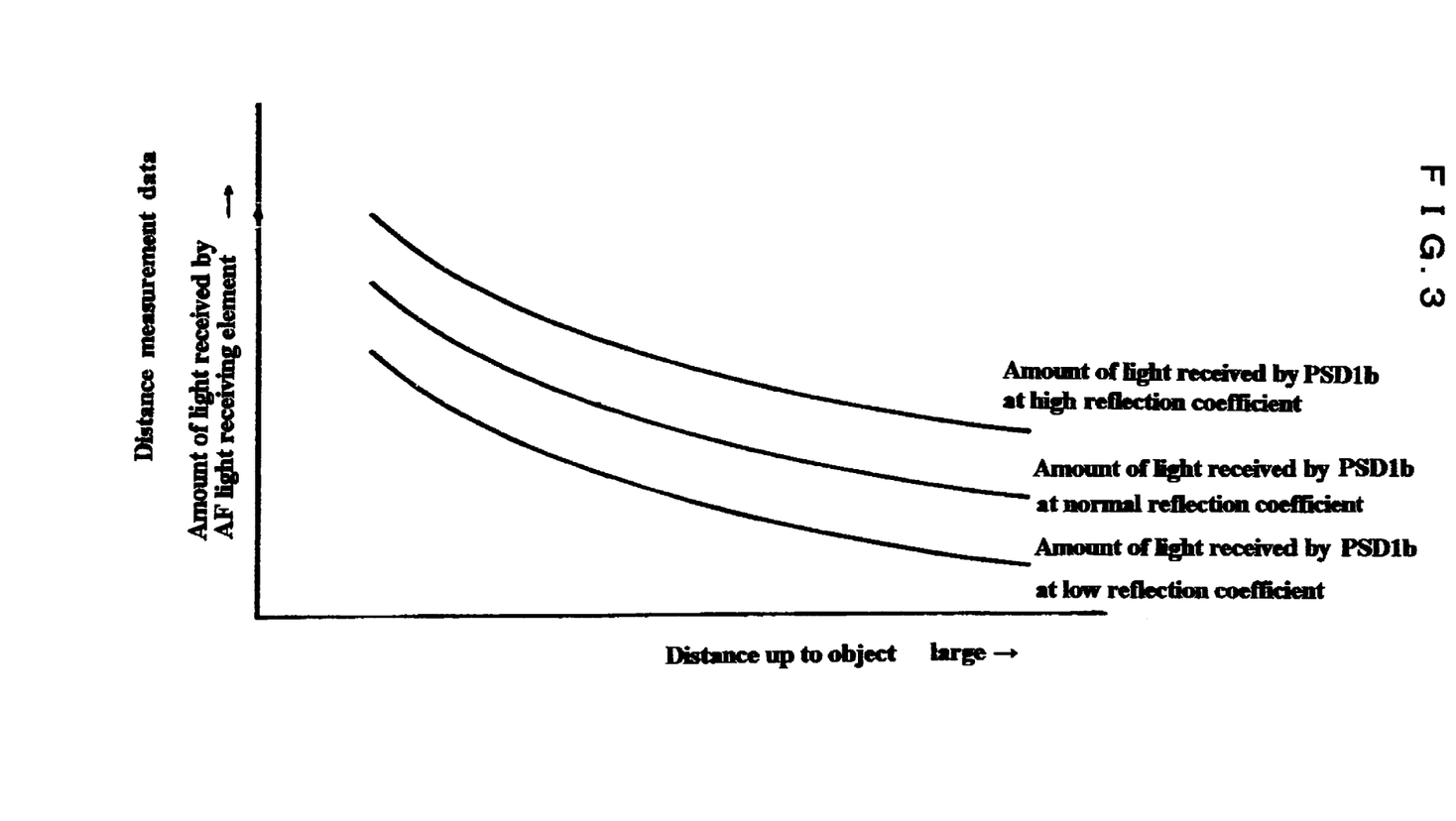
FIG. 3 is a view illustrating an action of the arrangement shown in FIG. 1.
Figure 4:
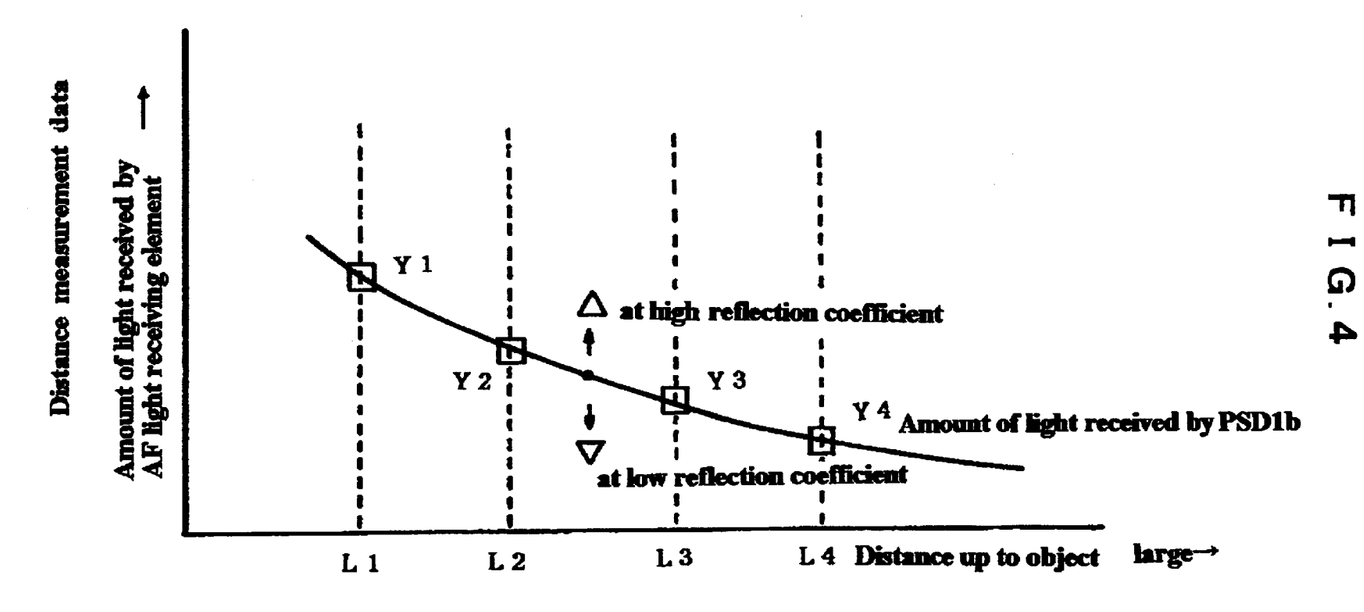
FIG. 4 is a view illustrating an action of the arrangement shown in FIG. 1.

A method for detecting a reflection coefficient of the object in STEP g is described hereinbelow. The embodiment makes use of a characteristics, in which a magnitude of a sum of outputs from the terminals 1b1 and 1b2 of the PSD 1b, that is, a magnitude of an amount of light received varies in accordance with a distance up to the object and the reflection coefficient of the object, and characteristics as shown in FIG. 3, in which an amount of light received by the PSD 1b decreases in value in proportion to a square of a distance up to the object as the distance increases where the object has a constant reflection coefficient.

At the time of adjustment before shipment, an object having a standard reflection coefficient H is measured at a plurality of known distances, and a relationship between distances Ln (n=1, 2, - - -, m) up to the object, as detected and magnitudes Yn (n=1, 2, - - -, m) (amounts of light received) of sums of outputs from the terminals 1b1 and 1b2 of the PSD 1b is correlated at distances to be stored as standard data in the storage circuit 4. A distance Ln designated by the same number n and a magnitude Yn, designated by the same number n, of a sum of outputs from the terminals 1b1 and 1b2 of the PSD 1b are correlated with each other and stored.

In actual use, on the basis of the standard data stored and a distance (referred to as "Lx") up to the object, detected in STEP c, a magnitude (referred to as "Yx") of a sum of outputs from the terminals 1b1 and 1b2 of the PSD 1b, in the event that an object having a standard reflection coefficient H is present at the detected distance up to the object, is found, and a reflection coefficient H' of the object is detected on the basis of a difference between Yx thus found and a magnitude of a sum (referred to as "Y'") of outputs from the terminals 1b1 and 1b2 of the PSD 1b, which sum has been obtained in actual use.

A distance (referred to as "Li") nearest to the distance Lx up to the object, which is detected in STEP c, is selected from distances Ln up to the object, which are stored in the storage circuit 4, and Yi stored in correlation with Li is selected. And the following formula (2) is obtained from the characteristics, in which an amount of light received by the PSD 1b decreases in value in proportion to a square of a distance up to the object as the distance increases in case that the object is the same in reflection coefficient, and is modified to provide the following formula (3).

$$Yx: Yi=(1/Lx^2):(1/Li^2) \qquad (2)$$

$$Yx=Yi(Li^2/Lx^2) \qquad (3)$$

Also, the following formula (4) relating to Y', Yx, H' and H is obtained from the characteristics, in which an amount of light received by the PSD 1b is in proportion to a reflection coefficient of the object, and is modified to provide the following formula (5).

$$Y': Yx=H':H \qquad (4)$$

$$Y'=Yx(H'/H) \qquad (5)$$

The following formula (6) results from the above described formulae (3) and (5), and a reflection coefficient H' of the object is found.

$$H'/H=(Y'/Yi)(Lx/Li)^2 \qquad (6)$$

The control circuit 2 executes the above described processing.

In this method, because a reflection coefficient of an object is detected on the basis of an output from the light receiving means (PSD 1b) for measuring a distance, there is no need to provide a separate light receiving element for detection of a reflection coefficient of an object, so that reduction in the number of parts is attained. In fact, it is possible to solve a problem that the number of parts increases due to a separate light receiving element for detection of a reflection coefficient of an object.

Also, because a reflection coefficient of an object is detected on the basis of an output from the light receiving means (PSD 1b) for active distance measurement, a distance up to the object and the reflection coefficient of the object can be detected with light projection for use in measuring a distance at a time. More specifically, in the case where a reflection coefficient of an object is detected on the basis of an output from a light receiving means for active distance measurement, light projection for measuring a distance and light projection for detection of a reflection coefficient can be performed at one time without being made separate, so that saving in consumption of electric power is achieved as compared with the case where light projection for measuring a distance and light projection for detection of reflection coefficient are performed separately.

Also, because at the time of adjustment before shipment, an object having a standard reflection coefficient H is measured at a plurality of known distances, and a relationship between distances Ln (n=1, 2, - - -, m) up to the object, as detected and magnitudes Yn (n=1, 2, - - -, m) (amount of light received) of outputs from the terminals 1b1 and 1b2 of the PSD 1b is correlated to every known distance to be stored as standard data in the storage circuit 4, and a reflection coefficient of the object is found on the basis of the standard data and outputs from the terminals 1b1 and 1b2 of the PSD 1b, detected in actual use, a reflection coefficient of the object is found, for which dispersion in characteristics of individual products is corrected. In other words, it is possible to eliminate a problem that, after a reflection coefficient of an object is found, the found reflection coefficient must be corrected in accordance with dispersion in characteristics of individual products.

Also, while the formulae (2) to (6) are used in the above described embodiments to perform interpolation calculation having been used for the standard data beforehand measured to detect a reflection coefficient of an actual object, a reflection coefficient corresponding to that distance up to the object in the standard data, which is nearest to a distance up to the object, detected in actual use, may be used depending upon a required detecting accuracy of reflection coefficient. In this case, the above described calculation is dispensed with, and so the processing speed is enhanced.

Also, if the standard data stored at the time of adjustment before shipment is a large quantity, it is possible to more accurately detect a reflection coefficient of an object. Further, if the quantity of the standard data is conformed to a required accuracy, it is possible to reduce a quantity of the storage region used.

Referring again to FIG. 2, when a reflection coefficient of an object is detected on the basis of the above described calculation (STEP g), an FM control value is found by means of calculation (STEP h). Concretely, the above described formula (1) is corrected on the basis of the reflection coefficient of the object to provide a formula (7), and the method of such correction is based on the characteristics that a reflection coefficient of an object is proportional to an amount of luminescence passing through a shutter aperture, and on the characteristics that an amount of luminescence passing through a shutter aperture changes in association with a square of a diaphragm. The formula (7) takes account of such matter.

$$F=(GNo/L)\sqrt{(H'/H)} \quad (7)$$

Figure 5:
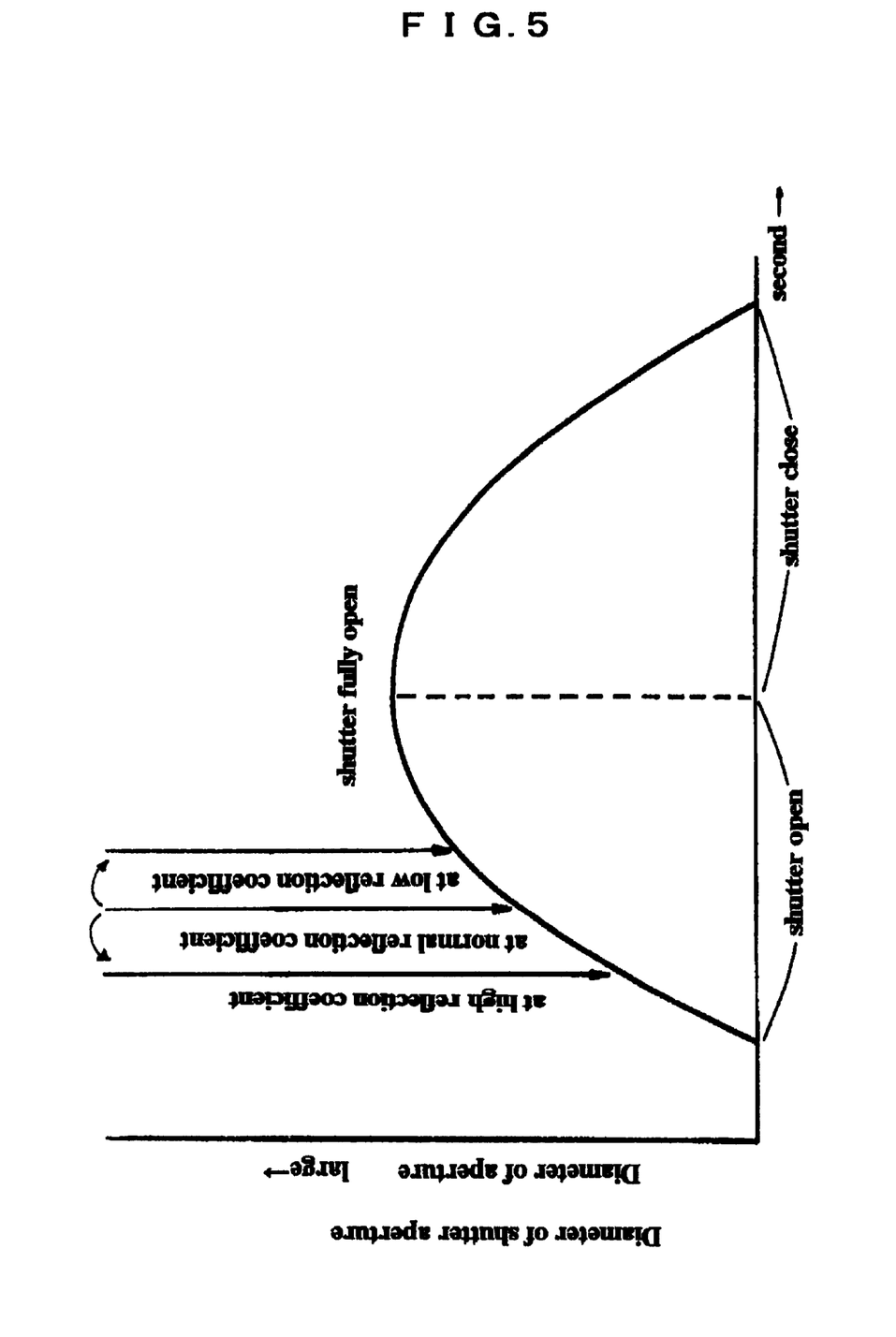
FIG. 5 is a view illustrating an action of the arrangement shown in FIG. 1.

A diaphragm F obtained by the formula (7) is corrected depending upon film sensitivity to provide a FM control value F', and when the diaphragm assumes the FM control value F' as the shutter aperture 5a increases, the stroboscope device 8 is caused by the stroboscope drive circuit 9 to project light, and light reflected by an object is received on a photosensitive section 7 through the shutter aperture 5a, for photographing (STEP i). In an example of actual control, when an object has a higher reflection coefficient than a standard reflection coefficient, a shutter aperture upon flashing of a stroboscope is made small, and when the object has a lower reflection coefficient than the standard reflection coefficient, the shutter aperture upon flashing of a stroboscope is made large as shown in FIG. 5. More specifically, while an amount of stroboscope light reflected by an object to pass through the shutter aperture 5a is conventionally controlled depending upon a distance up to the object, as seen from the formula (1), the amount of stroboscope light is controlled on the basis of a distance up to an object and a reflection coefficient of the object as in the formula (7).

In this manner, because an amount of stroboscope light 8 passing through the shutter aperture 5a is controlled in view of the reflection coefficient of the object, it is possible to mitigate a problem that an amount of light passing through the shutter aperture 5a varies depending upon different reflection coefficients of objects.

Further, because a distance up to an object and a reflection coefficient of the object are used to control light passing through the shutter aperture 5a, in the case where the light passing through the shutter aperture 5a causes the photosensitive section to be subjected to exposure, it is possible to mitigate a problem that the degree of exposure varies depending upon different reflection coefficients of objects.

Referring again to FIG. 2, when it is judged in STEP e that stroboscope radiation is not necessary because the surroundings are bright, it is held until the release switch is depressed up to the second stage to make the switch S2 ON (STEP j), and a so-called AE control is performed when the switch S2 is made ON (STEP k).

In addition, while the distance measuring means having a light receiving means in the above described embodiments employs a so-called active type one, it may employ a passive type one. In this case, the distance measuring means provided with a light receiving element for the monitoring purpose makes use of an output of the element to detect a reflection coefficient of an object, whereby it becomes unnecessary to newly provide a light receiving element for detection of a reflection coefficient of an object, and so reduction in the number of parts is attained.

Also, with the above described arrangement, the light receiving element comprises a PSD, but is not limited thereto. For example, the element may comprise a SPD or the like.

Also, while nothing is described above with respect to AF, a position of a not-shown photographing lens may be moved in accordance with the results of measuring a distance in STEPs b and c to effect an autofocussing function. In such a case, a distance up to an object detected in STEPS b and c will be necessarily used in AF operation to enable solving a problem that the results of distance measurement are wasted in the case of stroboscope being not used.

Also, while an explanation has been given to an example of controlling an amount of flash light, which is reflected by an object to pass through the shutter aperture 5a, in accordance with a distance up to the object and a reflection coefficient of the object in the so-called FM control, in which the stroboscope device 8 is made constant in amount of luminescence to change a diaphragm, at the time of stroboscope radiation, depending upon a distance up to an object, or the like, it is not limited thereto. For example, an IGBT having a high speed switching characteristics, or the like may be used as a light emitting switch such that, immediately after radiation of light is forcedly stopped in the course of radiation from the stroboscope device 8, reradiation of light is continuously repeated desired times, thereby making an amount of radiation in the entire continuous radiation an amount of stroboscope radiation per one time. In this case, when an object has a higher reflection coefficient than a standard reflection coefficient, an amount of stroboscope radiation may be made to decrease, that is, the number of the above described flashing actions may be made to decrease, and when the object has a lower reflection coefficient than the standard reflection coefficient, an amount of stroboscope radiation may be made to increase, that is, the number of the above described flashing actions may increase.

In addition, mention is positively made in this case to controlling the number of the above described flashing actions in accordance with a distance up to the object.

Also, while an amount of light received by the PSD 1$b$ is made a sum of outputs from the terminals 1$b$1 and 1$b$2, it is not limited thereto, and only one from either of the two terminals may be stored. In addition, the use of a value of the above described sum makes the value great, which is easy in processing.

Further, while an example has been shown, in which the shutter also serving as a diaphragm is used, it is not limited thereto, and may be applied to a camera, in which a diaphragm and a shutter are constructed separately. In this case, when the diaphragm assumes, for example, a value set on the basis of a distance up to an object and a reflection coefficient of the object, the shutter may be opened and the stroboscope may be made to flash.

Also, because the light receiving means for measuring a distance can be used to detect a reflection coefficient of a body being detected (corresponding to the object), it is possible to reduce the number of parts. In other words, it is possible to solve a problem related to an increase in the number of parts, caused by virtue of newly providing a light receiving means for detection of reflection coefficient, which serves to detect a reflection coefficient of the body being detected.

According to the invention, an amount of exposure at the time of flash photographing is controlled in accordance with a distance up to an object and a reflection coefficient of the object, so that it is possible to mitigate a problem that an mount of light passing through a shutter aperture varies depending upon different reflection coefficients of objects.

The distance measuring means includes a light receiving means adapted to receive light incident from the object and makes use of an output from the light receiving means to detect the distance up to the object, and the reflection coefficient detecting means detects the reflection coefficient of the object on the basis of an output from the light receiving means, whereby the light receiving means of the distance measuring means can be used to detect the reflection coefficient of the object. Accordingly, it is possible to reduce the number of parts in addition to an effect similar to that described above. In other words, it is possible in an exposure controlling device, which performs distance measurement, to solve a problem related to an increase in the number of parts, caused by virtue of newly providing a light receiving means for detection of reflection coefficient, which serves to detect a reflection coefficient of an object being detected.

The invention comprises a distance measuring means having a light receiving means adapted to receive light from an object being detected, and making use of an output from the light receiving means to detect a distance up to the object, and a reflection coefficient detecting means for detecting a reflection coefficient of the object being detected, on the basis of an output from the light receiving means, and so can detect a reflection coefficient of the object being detected, using the light receiving means for distance measurement. Accordingly, it is possible to reduce the number of parts. In other words, it is possible to solve a problem related to an increase in the number of parts, caused by virtue of newly providing a light receiving means for detection of reflection coefficient, which serves to detect a reflection coefficient of an object being detected.

What is claimed is:

1. An exposure control device including distance measuring means including light receiving means for receiving light from a subject object, and making use of an output from the light receiving means to measure a distance up to the subject object, the exposure control device comprising:

a storage circuit storing as standard data relating relationships between distances up to a standard test object having a standard reflection coefficient that is disposed at a plurality of known distances as actually measured by the exposure control device, and amounts of light received by the light receiving means when respective ones of the distances are measured;

reflection coefficient detecting means for detecting a reflection coefficient of the subject object on the basis of an output from the light receiving means, which yields a measured distance of the subject object, and the standard data stored in the storage circuit;

flash means for radiating light on the subject object; and control means for controlling an amount of exposure, when the flash means radiates, in accordance with the distance up to the subject object and the reflection coefficient of the subject object.

2. The exposure control device according to claim 1, wherein the reflection coefficient detecting means finds the reflection coefficient, on the basis of:

the standard data stored in the storage circuit;

the measured distance up to the subject object; and an amount of light received as indicated by the output from the light receiving means when the measured distance to the subject object is determined.

3. A distance measuring device including distance measuring means having light receiving means for receiving light from a subject object, and making use of an output from the light receiving means to measure a distance up to the subject object, the distance measuring device comprising:

a storage circuit storing as standard data relating relationships between distances up to a standard test object having a standard reflection coefficient that is disposed at a plurality of known distances as actually measured by the distance measuring device, and amounts of light received by the light receiving means when respective ones of the distances are measured, and reflection coefficient detecting means for detecting a reflection coefficient of the subject object on the basis of an output from the light receiving means, which yields a measured distance of the subject object, and the standard data stored in the storage circuit.

4. A method for producing a camera having an exposure control device comprising the steps of:

providing a distance measuring device including a light emitter, a light receiver, calculating circuitry for determining a distance to a subject object based on output of the light receiver;

disposing a standard test object, having a standard reflection coefficient, at known distances as the subject object and storing as calibration data measured distances output by the distance measuring device and outputs of the light receiver at respective ones of the distances to thereby record a relationship between the outputs of the light receiver at the measured distances and the standard reflection coefficient;

providing a reflection coefficient detecting means for detecting a reflection coefficient of an actual subject object based on an output of the light receiver, a measured distance provided by the distance measuring device, and the calibration data; and providing an exposure control device for controlling exposure when photographing the actual subject object based on the reflection coefficient detected and the measured distance to the actual subject object.

5. The method of claim 4 wherein providing the exposure control device includes:

providing a flash device for radiating light on the subject object; and the exposure control device controlling the exposure when the flash device radiates light in accordance with the measured distance to the actual subject object and the reflection coefficient of the actual subject object.

6. The method of claim 4 wherein providing the exposure control device includes:

providing a flash device for radiating light on the actual subject object; and the exposure control device controlling the exposure by controlling an amount of light the flash device radiates in accordance with the measured distance to the actual subject object and the reflection coefficient of the actual subject object.

7. A camera comprising:

a distance measuring device including a light emitter, a light receiver, calculating circuitry for determining a distance to a subject object based on output of the light receiver;

a memory storing calibration data produced by the distance measuring device and obtained by disposing a standard test object, having a standard reflection coefficient, at known distances as the subject object and storing as the calibration data measured distances output by the distance measuring device and outputs of the light receiver at respective ones of the distances to thereby record a relationship between the outputs of the light receiver at the measured distances and the standard reflection coefficient;

a reflection coefficient detecting means for detecting a reflection coefficient of an actual subject object based on an output of the light receiver, a measured distance provided by the distance measuring device, and the calibration data; and an exposure control device for controlling exposure when photographing the actual subject object based on the reflection coefficient detected and the measured distance to the actual subject object.

8. The camera of claim 7 wherein the exposure control device includes:

a flash device for radiating light on the actual subject object; and the exposure control device controlling the exposure when the flash device radiates light in accordance with the measured distance to the actual subject object and the reflection coefficient of the actual subject object.

9. The camera of claim 7 wherein the exposure control device includes:

providing a flash device for radiating light on the subject object; and the exposure control device controlling the exposure by controlling an amount of light the flash device radiates in accordance with the measured distance to the actual subject object and the reflection coefficient of the actual subject object.

* * * * *